DIGITAL TO ANALOGUE CONVERTER WITH DIGITAL FEEDBACK CONTROL

Filed Dec. 8, 1954 4 Sheets-Sheet 1

INVENTORS J.J.J. KERNAHAN
J.C. LOZIER
BY H. O. Wright
ATTORNEY

INVENTORS J. J. J. KERNAHAN
J. C. LOZIER
BY H. O. Wright
ATTORNEY

INVENTORS J. J. J. KERNAHAN
J. C. LOZIER
BY H. O. Wright
ATTORNEY

INVENTORS J. J. J. KERNAHAN
J. C. LOZIER
BY H. O. Wright
ATTORNEY 2,775,727

DIGITAL TO ANALOGUE CONVERTER WITH DIGITAL FEEDBACK CONTROL

John J. J. Kernahan, Livingston, and John C. Lozier, Short Hills, N. J., assignors to Bell Telephone Laboratories, Incorporated, New York, N. Y., a corporation of New York Application December 8, 1954, Serial No. 473,829

8 Claims. (Cl. 318—28)

This invention relates to "digital" or "sample data" feedback control systems, such as those used to perform digital to analog decoding.

In many information handling systems, it is necessary to convert digital information into analog form, in terms of an output shaft position, for example. In such systems, it has been proposed heretofore to secure a code wheel to the analog output shaft. The code wheel is transparent and has opaque zones painted on its surface in a predetermined code. With a light source on one side of the code wheel and photocells on the other side, the position of the code wheel may be uniquely determined by the state of the photocells. The code wheel and its reading head thus sense the position of the analog output shaft. The actual position of the output shaft is compared with the input digital information representing the desired position of the shaft, and the shaft is then rotated in accordance with the difference between the two indications. However, in systems of the prior art, there has been considerable lag in the movement of the output shaft, particularly in following small changes of the input digital information.

Accordingly, the principal object of the present invention is to decrease the time lag in digital to analog converters.

A collateral object is to avoid overshooting and oscillations in digital to analog converters.

In accordance with one aspect of the present invention, the lag of the position of the analog element with respect to the digital input signals is reduced by employing a restoring voltage which varies in a non-linear manner with increasing error. Specifically, the voltage versus error characteristic has a steep initial slope which is substantially reduced at higher error levels. This improves the small signal performance of the feedback control systems without degrading the large signal performance. In addition, this technique permits full utilization of the accuracy of the device which senses the position of the analog output element in the feedback control system.

Another aspect of the invention involves the use of a variable pulse width restoring voltage to further reduce the lag, particularly as the position of the analog element approaches the position indicated by the coded input signals. The variable pulse width technique is eminently suitable for use with digital computer circuits, inasmuch as the width of the pulses can be fixed by arithmetic operations on the digital error indications. In addition, the use of a sampling rate for the coding mechanism coupled to the analog output element, which is substantially greater than the rate at which the codes indicating the desired position of the output element are supplied to the digital to analog converter, helps to avoid hunting or overshooting by the analog output element.

Other objects and various advantages and features of the invention will become apparent by reference to the following description taken in connection with the accompanying drawings forming a part thereof, and from the appended claims.

Figure 1:
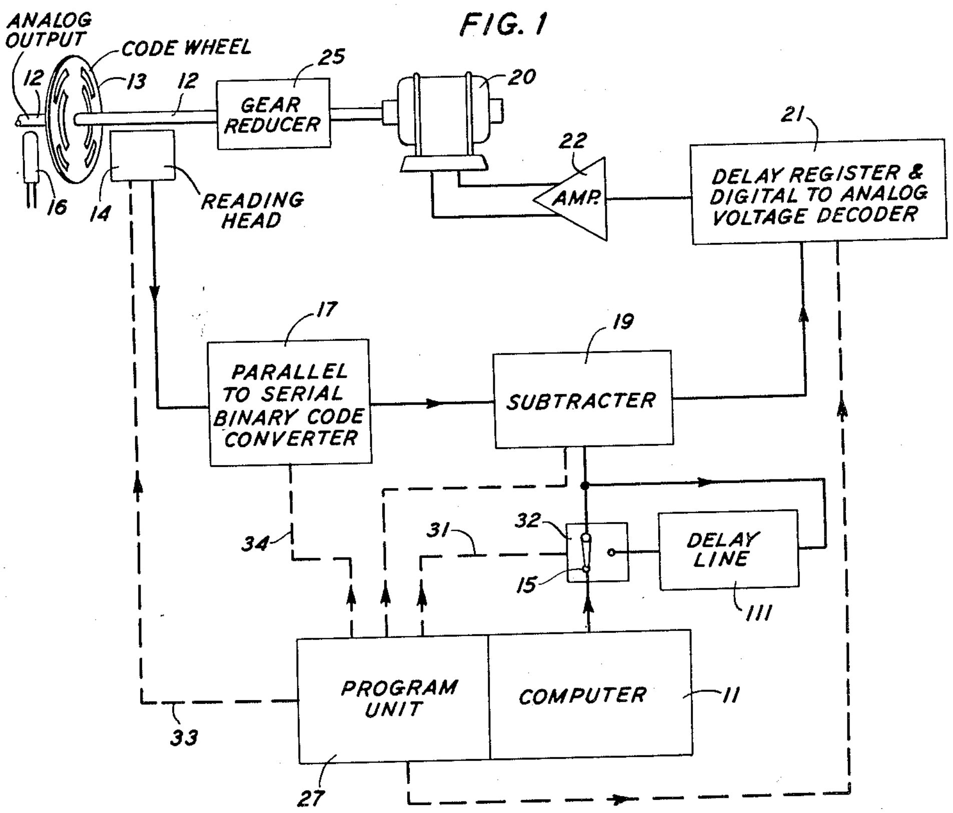
Fig. 1 is a schematic block diagram of an illustrative embodiment of the invention.

Referring more particularly to the drawings, Fig. 1 shows, by way of example and for purposes of illustration, a block diagram of an apparatus and the associated circuits for converting digital information into analog form. In Fig. 1, the computer 11 calculates successive solutions to a problem with each solution representing a desired position of an output shaft 12.

The output shaft 12, which is shown in the upper left hand corner of Fig. 1, has a code wheel 13 rigidly secured thereto. The code wheel 13 is preferably of the type disclosed in the article entitled "A digital code wheel," by J. J. Kernahan, which appeared on pages 126 through 131 of the April 1954 issue of the Bell Telephone Laboratories' "Record." The code wheel 13 is transparent and has opaque zones painted on its surface in a predetermined code. Rays of illumination from a light source 16 pass through predetermined areas of the code wheel 13 and selectively energize corresponding photocells in the reading head 14. Circuits coupled to the photocells provide a unique representation of the instantaneous angular position of the output shaft 12.

The code indications generated by the reading head 14, in its instantaneous reading of the code indications on the code wheel 13, are in "parallel" form. In other words, the separate digits of the number representing the actual position of the code wheel appear as the presence or absence of a voltage on separate wires, with one wire for each digit. However, the output of the computer 11 is in "serial" binary form. More specifically, the digits of the number representing the desired position of the output shaft 12 appear at the output terminal 15 of the computer 11, as successive pulses or spaces in an accurately timed pulse train.

Because computations are normally more economically performed with numbers in serial form than when they are expressed in parallel form, the parallel indications at the reading head 14 are changed to serial form in the converter 17. This parallel-to-serial binary converter may be of the type disclosed in an article entitled "An optical position encoder and digit register" by H. G. Follingstad et al., which appeared at pages 1573 through 1583 of the November 1952 issue of the Proceedings of the I. R. E. (volume 40, No. 11). The difference between the actual and the desired positions of the output shaft 12 is determined by the subtracter 19.

The output of the subtractor 19 is a binary number indicating the difference between the number read from code wheel 13 and the number appearing at the output 15 of the computer 11. This numerical output is transformed into a suitable voltage for the energization of the motor 20 by the delay register and digital to analog voltage decoder 21, and the amplifier 22. The motor 20 is coupled to the output shaft 12 through the gear reduction box 25. By way of example, a reduction of 554:1 was found to be satisfactory.

In working with serial binary numbers, precise control of the timing of various operations involving the pulse trains representing numbers is obviously essential. In the present arrangement, this control is accomplished by the program unit 27 associated with the computer 11. In common with most serial digital computers, the program unit includes a master oscillator and several counters. These may, for example, include high and low speed ring counters, with the low speed ring counter advancing one step for each count of the high speed ring counter. In addition, one full counting cycle of the low speed counter may correspond to one cycle of operation of the circuits of Fig. 1.

There are many known circuits which require two simultaneous pulse input signals for the transmission of an output pulse. Such circuits are termed AND circuits, or coincidence gates. By connecting the first and second input terminals of an AND circuit to terminals of the fast and slow counters, respectively, a time interval corresponding to any desired fast count of the fast ring counter falling within any desired count of the slow counter may be selected. At the selected time interval, a synchronizing pulse from the program unit 27 is applied to the desired circuit component. These program control circuits are indicated by dashed lines in Fig. 1.

The serial binary output of the computer 11 is in the form of thirteen serial binary digits, which make up a single binary number representing the desired position of the output shaft 12. The individual binary digits are represented by a pulse or the absence of a pulse, representing a "1" or "0," respectively. The computer 11 has a one megacycle pulse rate, and a complete binary number therefore passes the output terminal of the computer in 13 microseconds.

In operation, the computer 11 requires, for each successive solution to a problem, a time interval of about one-eighth of a second. Accordingly, after each interval of one-eighth of a second, a group of pulses 13 microseconds in length appears at the output terminal 15 of the computer 11. Prior to the arrival of the pulse group, a control pulse on lead 31 from the program unit 27 sets the electronic switch 32 to the position indicated in Fig. 1. The computer output is therefore applied to the subtracter 19. Meanwhile, leads 33 and 34 from the program unit 27 have been energized to read the code wheel 13, to translate the readings into serial binary form in the converter 17, and to control the application of the pulses to the subtracter 19 in synchronism with the signals from the computer 11.

Figure 2:
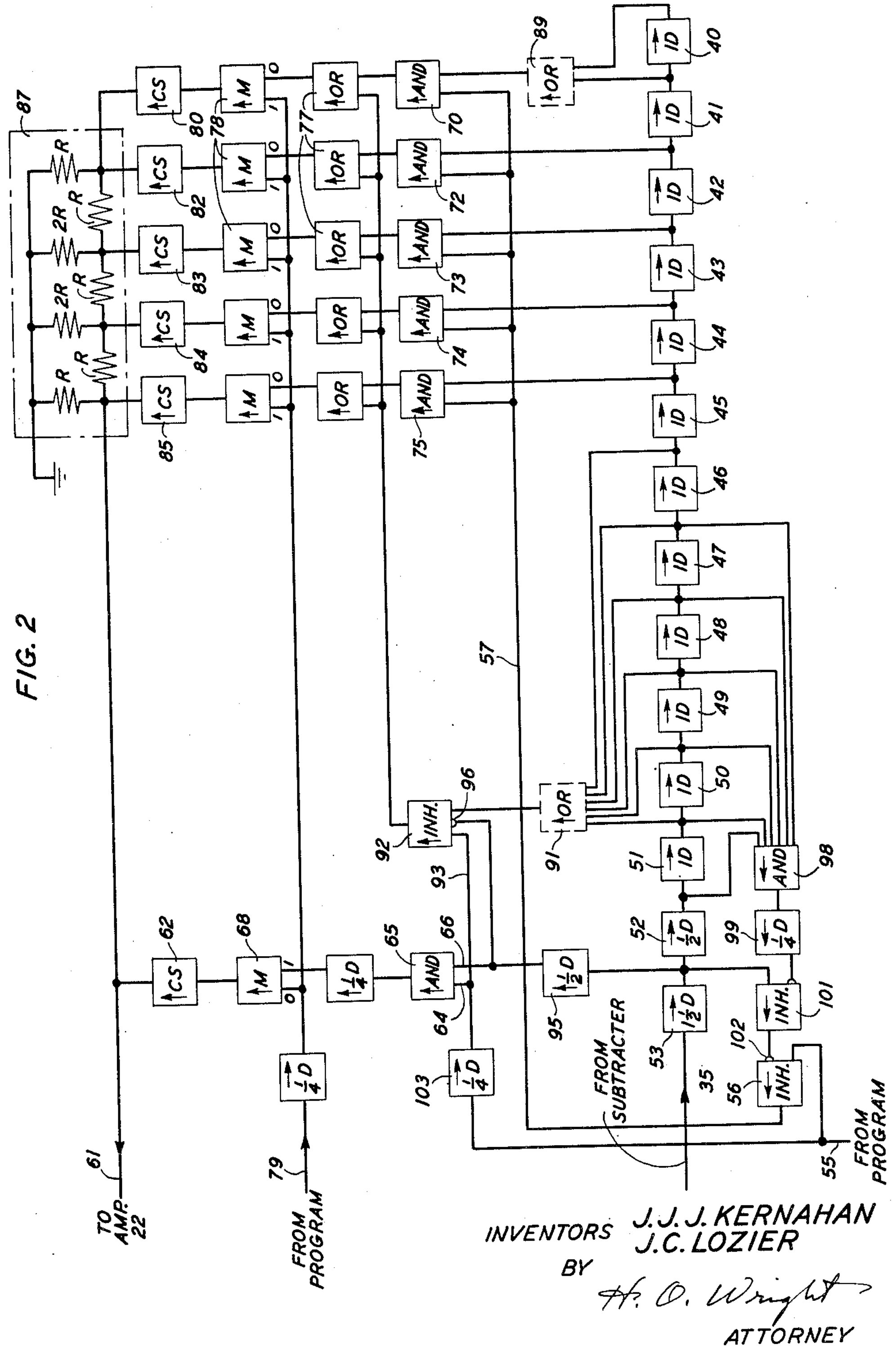
Fig. 2 is a logical circuit diagram of the delay register and digital to analog voltage decoder of Fig. 1.
Figure 5:
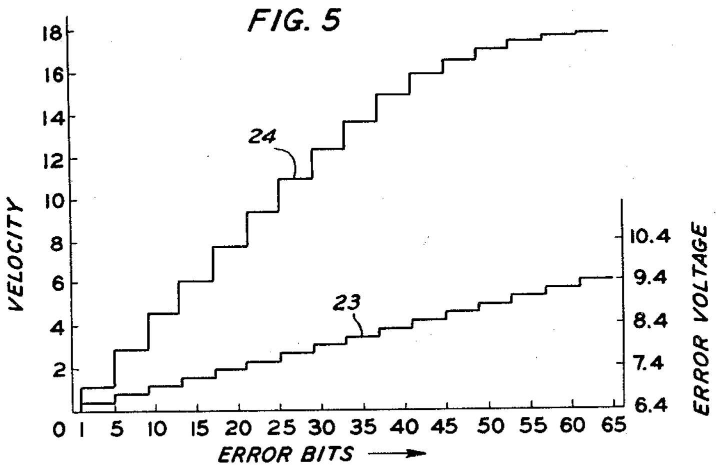
Figs. 5 and 6 show plots of the response characteristics of the rebalancing network of the circuit of Figs. 1 and 2.

The delay register and digital to analog voltage decoder 21 will now be described in greater detail in connection with Figs. 2 and 5 of the drawings. In general, the circuit of Fig. 2, represented by block 21 of Fig. 1, develops a voltage to be applied to the motor 20 in accordance with the digital output of the subtracter 19. This digital output represents the number of "bits" or binary digits of error between the actual and the desired positions of the output shaft. In Fig. 5, the output voltage to the motor 20 is plotted against the number of error bits in curve 23. It may be noted that the voltage increases abruptly at one error bit, and then increases in additional steps with additional increments of four error bits. After 61 error bits, there is no further increase of voltage with additional error: this represents the maximum voltage applied to the motor 20. The plot 24 of Fig. 5 represents the velocity of the motor 20 when the voltage indicated in the curve 23 is applied to the motor.

Returning to Fig. 2, the logical circuit which produces the characteristic 23 of Fig. 5 will now be considered. In the diagram of Fig. 2, the circuits are shown in terms of the "building blocks" or basic packaged unit circuits which may be employed in an overall digital computer circuit. While the specific circuits which have been employed as these basic computer components have each taken many different forms, one satisfactory set of packages is disclosed in the article entitled "Regenerative amplifier for digital computer applications," by J. H. Felker, which appeared at pages 1584 through 1596 of the November issue of the "Proceedings of the I. R. E." (volume 40, Number 11). The five basic logical circuit elements which are disclosed on pages 1594 and 1595 of this article, and which are employed in the circuit diagram of Fig. 2, are as follows:

The OR unit, such as unit 77 of Fig. 2, yields a pulse output if a pulse is present at any of the inputs to the unit.

The AND unit, such as unit 70 of Fig. 2, requires energization of all inputs to yield an output.

The "Inhibit" unit, such as unit 92 of Fig. 2, is designated "Inh" in the drawings. It is generally similar to an AND unit, in that all of the normal inputs to the unit must be energized for it to yield an output pulse. However, a pulse on the inhibit input lead (marked with a semi-circle at the point where the inhibit lead is connected to the inhibit unit) over-rides all other signals and blocks the output of the unit.

A memory unit, such as unit 68 designated "M" in Fig. 2, may be set to either of two conditions, the "0" state or the "1" state. When set to the "0" state, it has no output. When the "set 1" lead has been energized, however, the memory unit generates pulses, one at each digit interval, until the memory unit is reset to the "0" condition. When both input leads are energized simultaneously, the memory unit assumes the "0" state, and has no output.

Delay units, such as units 40 through 53 of Fig. 2, are designated by boxes with the letter "D" therein, together with a number indicating the number of digit periods of delay included in the unit. Each of the first four logic elements noted above also introduces a delay of one-quarter digit period, or one-quarter microsecond.

As disclosed in the article by Mr. Felker cited above, the pulse regenerator is an important part of these logical circuits. The specific pulse generator circuit shown in the Felker article operates satisfactorily and may be used. Alternatively, an improved version of the regenerator appears in J. H. Felker's copending application Serial No. 376,923, filed August 27, 1953, assigned to applicant's assignee, and may also be used.

In Fig. 2, the output from the subtracter 19 of Fig. 1 appears at terminal 35. This output is a serial binary number including the thirteen binary digits which are employed to represent the error in the position of the code wheel. The serial binary pulses from the subtracter are applied to the delay line made up of the delay units 40 through 53, inclusive, which include a total of fourteen digit periods of delay. At the instant when the first digit of the thirteen significant digits arrives at the output of the delay unit 40, a pulse is applied to lead 57 from the program unit 27 (see Fig. 1) by way of terminal 55 and the inhibit unit 56. This serves to read out the desired digits of the number in the delay line as will be explained hereinafter.

In plot 23 of Fig. 5 indicates the desired input-output characteristics of the circuit of Fig. 2. That is, when the number indicating error bits is 0, there is no error voltage; at one error bit, an incremental voltage is produced; and after each additional four error bits, the voltage is increased up to 61 error bits. Thus, at 64 bits and higher errors (as well as at 61, 62 and 63 error bits) the restoring voltage applied to the servomotor is a maximum. The number 64 in the decimal system corresponds to the number 1,000,000 in the binary system. This is the sixth power of two and can also be indicated as $2^6$.

In the following table I, several combinations of the thirteen digits which may be present at the outputs of the delay units 40 through 52 are set forth. In this table, the absence of a pulse is indicated by a "0"; the presence of a pulse is indicated by a "1"; and pulse positions where a pulse may or may not be present are marked with an X.

*Table I*

| | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ | Value |
|---|---|---|---|---|---|---|---|---|---|---|---|---|---|---|
| (*a*) | 0 | 0 | 0 | 0 | 0 | 0 | 0 | X | X | X | X | X | X | Positive; less than 64 bits. |
| (*b*) | 0 | X | X | X | X | X | X | X | X | X | X | X | X | Positive; greater than 64 bits. |
| | | (Minimum of 1 one) | | | | | | | | | | | | |
| (*c*) | 1 | 1 | 1 | 1 | 1 | 1 | 1 | X | X | X | X | X | X | Negative; less than 64 bits. |
| (*d*) | 1 | X | X | X | X | X | X | X | X | X | X | X | X | Negative; greater than 64 bits. |
| | | (Minimum of 1 zero) | | | | | | | | | | | | |

Referring more specifically to Table I, four classes of numbers are indicated in lines (*a*), (*b*), (*c*), and (*d*). In each line, the least significant digit ($2^0$) is to the right, and the most significant digit ($2^{12}$) is to the left. This is the same relative position that the digits assume at the outputs of the delay units 40 through 52. The most significant digit ($2^{12}$) indicates which direction the motor must be turned to most quickly restore the output shaft 12 to the desired position. Thus, in lines (*a*) and (*b*), digit $2^{12}$ is "0" and a positive voltage is required to rotate the motor in one direction. In lines (*c*) and (*d*), however, the digit $2^{12}$ is 1, and a negative voltage is required to rotate the servomotor in the opposite direction.

The output voltage at terminal 61 of Fig. 2 has a nominal zero which is approximately 6.4 volts for zero error conditions. Under these conditions, no voltage will be applied to the motor 20 by the amplifier 22. When the digit $2^{12}$ is "0," the current switch 62 is operated and the basic level of 6.4 volts is retained. When the digit $2^{12}$ is "1," however, the current switch 62 is de-energized and the voltage level at terminal 61 is reduced to approximately 3.0 volts. The "read" pulse applied to the lead 55 by the program unit appears at one input 64 to the AND unit 65 simultaneously with the arrival of a $2^{12}$ pulse (if one is present) at the other input 66 of the AND unit 65. This sets the memory unit 68 to the "1" state and turns off the current switch 62. This in turn reduces the voltage at output terminal 61, as noted above. The instrumentation and operation of a current switch will be described in detail hereinafter through reference to Fig. 4.

Returning to Table I, the positive numbers (*a*) and (*b*) will now be compared. Initially, it is known that these numbers are positive because the digit identified as $2^{12}$ is "0." The number (*a*) is also less than 64 in value, inasmuch as all of the digits $2^6$ through $2^{11}$ are also equal to "0." The number (*b*), however is equal to or greater than 64 because at least one of the digits $2^6$ through $2^{11}$ is equal to "1." As indicated by plot 23 of Fig. 5, the maximum voltage will be applied to the servo for any number greater than 61.

The manner in which the circuit of Fig. 2 provides the proper output voltage for numbers of the class indicated at (*a*) in Table I (numbers less than 64) and for those of the class indicated at (*b*) in Table I (numbers greater than 64) will now be described. The thirteen digits shown in Table I are applied in pulse form to terminal 35 and proceed down the delay line made up of delay units 40 through 53. At the instant when each of the digits $2^0$ through $2^{12}$ is at the output of its corresponding delay unit 40 through 52, respectively, a "read" pulse is applied to lead 57. The "read" pulse is applied to terminal 55 and passes through inhibit unit 56 to the lead 57. The "read" pulse on lead 57 provides one input to the AND units 70 and 72 through 75. If the other input to any one of the AND units is energized by the presence of an appropriate digit pulse at the output of one of the delay units 40 through 45, a pulse will pass through the appropriate AND unit. The pulse will also pass through the OR units 77 and set the corresponding memory units 78 to the "0" state. The memory units 78 have previously all been set to the "1" state by a program pulse applied to lead 79. Therefore, the memory units 78 store the complement of the pulse indications which appear at the output of AND units 70 and 72 through 75.

Figure 4:
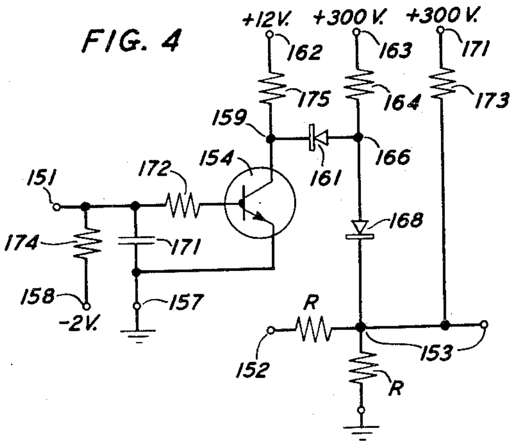
Fig. 4 is the circuit diagram of a current switch which is employed in the circuits of Figs. 2 and 3.

The voltage at the output terminal 61 to the amplifier is determined in part by the resistance network 87. As mentioned hereinbefore, 6.4 volts correspond to a zero indication at the input terminal 61 of the amplifier. The relative values of the resistances in the network 87 are indicated by the designations R and 2R on the various resistances. The current switches, 80 and 82 through 85, which will be described in detail in connection with Fig. 4, are turned on and increase their output current when their associated memory units are set to the "0" state.

The resistance ladder 87 weights the current supplied by the current switches 80 and 82 through 85 in accordance with the plot 23 of Fig. 5. Thus, the presence of either of the digits $2^0$ or $2^1$ operate current switch 80 to increase the voltage at terminal 61 by 0.2 volt. OR unit 89 combines the outputs from delay units 40 and 41 to give the foregoing result. Current switch 82, corresponding to the digit $2^2$, is also given a weighting of 0.2 volt. Thus, there is no change in output voltage at terminal 61 when the number of error bits changes from three to four. The number three corresponds to the binary number 011, and results in current switch 80 being turned on while current switch 82 is off; with number four, however, corresponding to the binary number 100, the conduction states of the two switches 80 and 82 are reversed and there is no net change in output voltage.

Current switches 83, 84 and 85, however, are given progressively increased weighting of 0.4, 0.8 and 1.6 volts, respectively. In operation, the currents which are present are summed by the resistance ladder, and the output appears at terminal 61. For positive numbers less than 64 of the type indicated at (*a*) in Table I, the voltage may range from 6.4 volts to 9.6 volts.

When the number is positive and greater than 64, as indicated at (*b*) in Table I, a pulse appears at the output of the delay units 46 through 51 at the proper instant. This output pulse is applied to OR unit 91, and is gated through inhibit unit 92 by a program pulse on lead 93 of the inhibit unit, to all of the OR units 77. This energizes all of the current switches 80 and 82 through 85, and yields a maximum output voltage at terminal 61, irrespective of the pulse pattern at the output of delay units 40 through 45.

When negative numbers are present, however, a pulse from the output of delay unit 53 indicating the presence of digit $2^{12}$ is appropriately delayed in the one-half digit delay unit 95 and is applied to the inhibit terminal 96 of the inhibit unit 92. In addition, and as mentioned before, the current switch 62 is turned off, and thus reduces the voltage at terminal 61 to about 3.0 volts (when all other error bits are equal to zero).

The multiple input AND unit 98 determines slew, or maximum, voltage conditions for negative numbers, much as the OR unit 91 determines such conditions for positive numbers. Note, however, that the taps leading from the delay line 40 through 53 to the AND unit 98 are displaced one digit to the left, as compared with those energizing the OR unit 91. This is required to compensate for the delays of the logic circuitry following the AND unit 98.

When any of the inputs to the AND unit 98 are zero, this indicates that the negative number is greater than 64, and that slew negative voltage conditions are in order. Accordingly, it is desired that none of the current switches 80 and 82 through 85 be energized inasmuch as their energization would increase the output voltage at terminal 61. This is accomplished by blocking the "read" pulse to lead 57. Digit $2^{12}$ passes through inhibit unit 101 to the inhibit terminal 102 of inhibit unit 56, when there is no output from delay unit 99 resulting from the lack of energization of at least one of the inputs to the AND unit 98. The foregoing sequence of operations occurs when the difference number is negative and greater than 64, and thus is of the class designated (*d*) in Table I.

When the number is negative and is less than 64, however, all of the inputs to AND unit 98 are energized, the pulse representing digit $2^{12}$ is blocked at inhibit unit 101, and the "read" pulse passes through inhibit unit 56 to energize lead 57. Under these circumstances, only the memory units 78 which correspond to the appropriate digits of the binary number in the delay line 40 through 52 are set to the "0" state. Thus, in accordance with the digits $2^0$ through $2^6$ which are present, the output voltage at 61 varies between 3.0 and 6.4 volts. It is again noted that an output of 3.0 volts corresponds to maximum negative voltage conditions at the output of amplifier 22 of Fig. 1, and that 6.4 volts represents the balanced condition.

The foregoing description of Fig. 2 shows how the box 21 of Fig. 1 may be instrumented. The circuit of Fig. 2 is also useful in illustrating simple logical switching circuitry. For example, the switch 32 of Fig. 1 which is shown schematically as a mechanical switch, is actually an electronic switch. This switch 32 may be instrumented by the use of an AND unit and an inhibit unit, as shown at 65, 92 in Fig. 2. In Fig. 2 the signals at the output of delay unit 103 are gated through the AND unit 65 or the inhibit unit 92, depending on whether or not there is a signal at the output of delay unit 95. Thus, the presence or absence of a signal at the output of delay unit 95 "switches" the signal at the output of delay unit 103 from one output circuit to another. In Fig. 1, the lead 31 from the program unit is the control signal, and corresponds to the output from delay unit 95 in the switching circuit of Fig. 2, discussed above. Switch 32 of Fig. 1 and other switches shown schematically in the drawings may be built up of logical circuit elements as disclosed above.

The computer 11 of Fig. 1 determines the desired value of the output shaft 12 once every 131,072 microseconds. This is equivalent to a rate of approximately 8 cycles per second. This rate is fixed by the operating speed of the computer, and by the calculations which must be performed to arrive at the digital output. However, when new information is applied to the servo loop at this low rate, the position of the output shaft 12 lags the position indicated by the computer to a substantial extent. While the speed of the computer cannot be readily increased, it has been determined, in accordance with the invention, that the lag in the servo loop can be substantially reduced by reading the code wheel 13 more frequently. Accordingly, the reading head 14 is actuated by the program unit 27 four times for each new output number from the computer 11. During the period between new solutions, the output from the computer 11 is circulated in the sixteen digit delay line 111. The sampling rate is thus increased from 8 samples per second to 32 samples per second. The switch 32 serves to introduce the new output of the computer 11 into the subtracter 19 and the delay line 111 every 131,072 microseconds when it is produced by the computer. While the accuracy of tracking of the output shaft 12 and the computer 11 is not quite as great as if the computer 11 also had an output rate of 32 cycles per second, it is greatly improved over the previous practice of reading the code wheel 13 at the same low rate at which the computer 11 produces output information.

Figure 3:
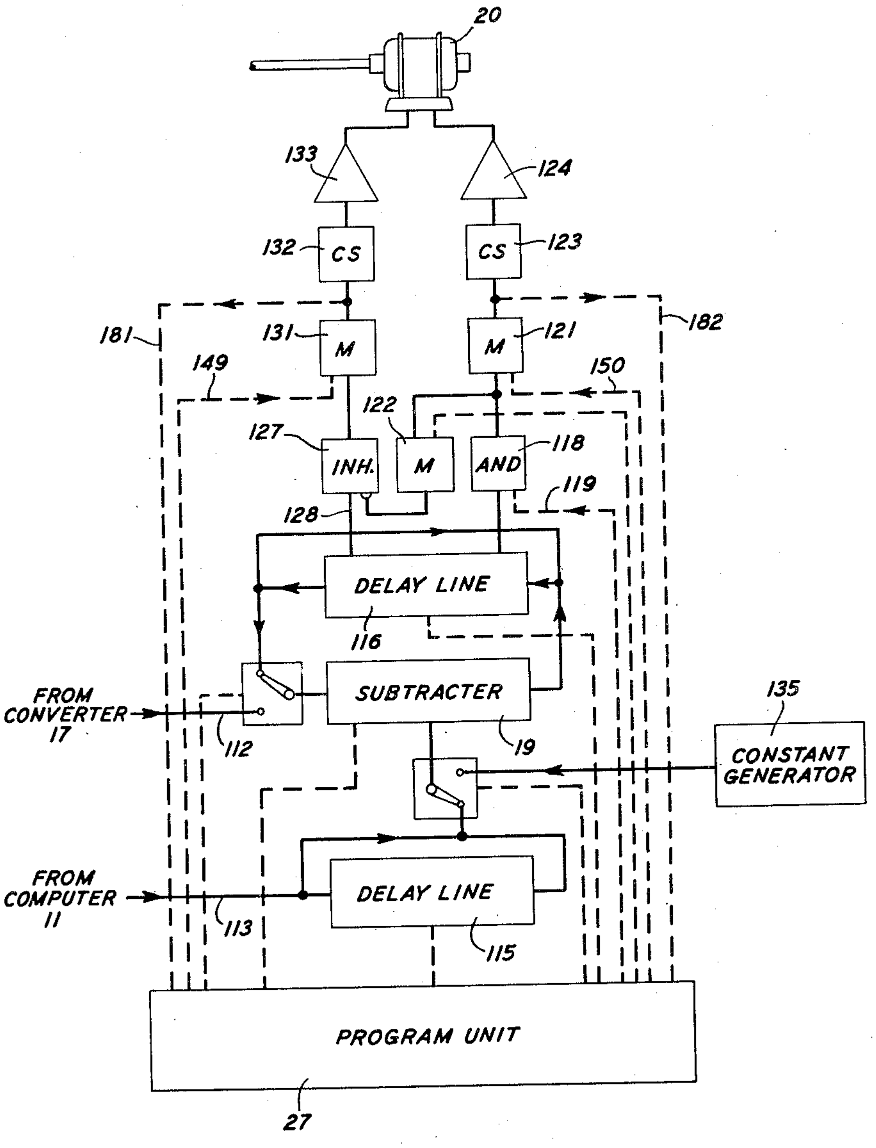
Fig. 3 is a block diagram of the delay register and digital to analog decoder of an embodiment of the invention in which pulses of varying widths are employed.

In Fig. 3, a variation of a portion of the servo loop of Fig. 1 is shown. The circuit of Fig. 3 employs a pulse width modulation technique for energizing the motor 20, which still further reduces the lag between the output shaft 12 and the desired position of the shaft, as indicated by the computer 11. In Fig. 3, terminal 112 represents the output from the converter 17 of Fig. 1, and terminal 113 is the output from the computer 11 of Fig. 1. The subtracter 19 and the program unit 27 of Fig. 1 are also shown in Fig. 3.

The sampling rate for the circuit of Fig. 3 is the same as that for the circuit of Fig. 1. Specifically, a subtraction operation in which the number circulating in delay line 115 is subtracted from the number which appears on lead 112 occurs after every 32,768 microseconds. As mentioned hereinbefore, this corresponds to a rate of approximately 32 samples per second. This difference is circulated in the delay line 116. The delay line 116 is similar to the delay line made up of the delay units 40 through 53 of Fig. 2, in that certain logic operations are performed on the digits stored in the delay line. Thirteen digits which correspond to those shown in Table I are stored in delay line 116. The digit designated $2^{12}$ in Table I is the sign bit. After the difference number is distributed along the length of the delay line 116, a pulse from the program unit 27 is applied to the AND unit 118 by way of lead 119 to examine the sign bit. If the sign bit is present, a pulse is gated through the And unit 118 to energize memory units 121 and 122. The energization of memory unit 121 operates current switch 123. The signal from current switch 123 is amplified at 124 and applied to servomotor 20. When the memory unit 122 is energized, inhibit unit 127 blocks any signals which might otherwise energize motor 20 in the opposite direction. The foregoing situation, in which a sign bit is present, corresponds to a negative number.

When the sign bit is not present, a positive number is indicated. If this number has magnitude, the motor 20 should be operated in the opposite direction. The normal input 128 to the inhibit unit 127 is connected to the appropriate points along the delay line 116 to examine the difference number for bits in digits $2^0$ through $2^{11}$. If any of these digits are present (in the absence of a sign bit), a pulse will pass through the inhibit unit 127 to the memory unit 131. The current switch 132 will be energized, and its signal, as amplified by the amplifier 133, will operate motor 20 in the opposite direction.

The circuit of Fig. 3 applies pulses of varying width to the servomotor 20. This pulse width modulation operation will now be described in greater detail. The sampling rate of 32 cycles per second is now broken down into smaller time intervals. Specifically, the 32,768 microseconds in each sampling interval are divided into 64 intervals of 512 microseconds apiece. After a delay of four of these subintervals, or 2,048 microseconds, the subtracter 19 subtracts one binary digit from the difference which has been circulated in the delay line 116, and returns the new number to the same delay line. The single binary digit which is subtracted is obtained from the constant generator 135. At successive subintervals of 512 microseconds, the subtracter deducts another binary digit from the number stored in the delay line 116. If a specific subtraction operation reduces the number to 0, then the pulse which has been applied to the servomotor 20 is stopped, and no new pulses may be applied until the start of a new sampling interval. This is accomplished by a program pulse on leads 149 and 150 which resets the memory units 121 and 131 to zero immediately before the number in the delay line 116 is examined by the AND unit 118 and the inhibit unit 127. The program unit 27 thereafter notes the condition of the memory units 131 and 132 by way of leads 181 and 182. If both are de-energized, this indicates that the number in the delay line is zero, and no further enabling pulses are supplied to the subtracter 19 by the program unit 27. The motor 20 therefore remains de-energized until the start of the next sampling interval.

The above-described variable pulse width mode of operation substantially duplicates the pulse amplitude voltage versus error characteristic illustrated in Fig. 5 with one important exception. The phase lag of the position of the shaft 12 with respect to the desired position of the shaft as indicated by the output of the computer 11 is substantially reduced. This improved mode of operation will be brought out in greater detail in connection with Figs. 6 and 7.

Figure 6:
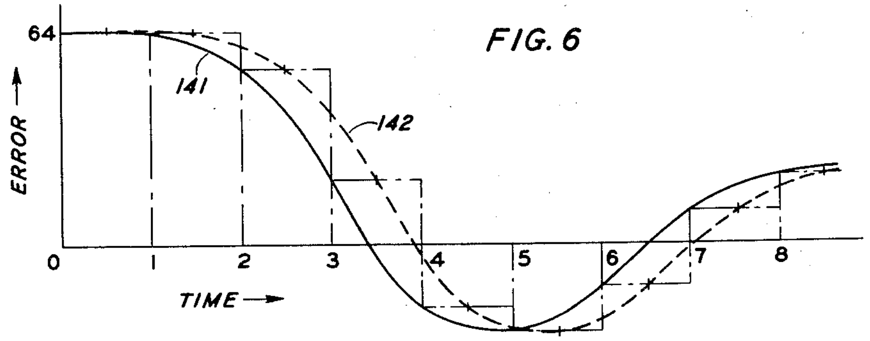

In Fig. 6, error in terms of binary digits of difference is plotted against time in terms of sampling intervals. The solid line curve 141 of Fig. 6 represents the difference between the computer output and the reading head output at successive sampling intervals. In the pulse amplitude circuits of Figs. 1 and 2, the amplitude of the pulse is determined at the beginning of a sampling interval, and this amplitude is maintained throughout the sampling interval. Accordingly, as indicated by the dashed line plot 142 of Fig. 6 the voltage applied to motor 20 always lags behind the error characteristic 141 by one-half of one sampling interval.

Figure 7:
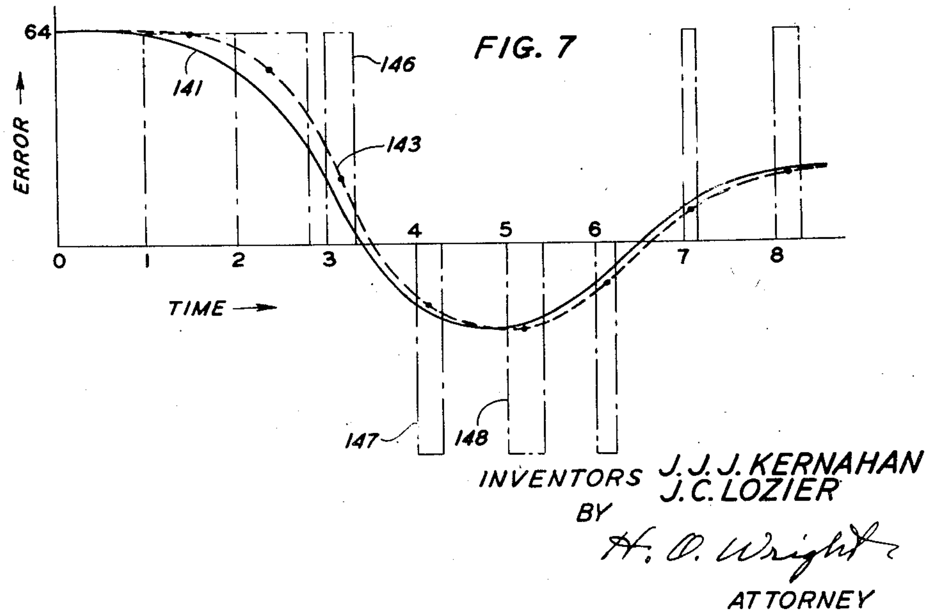
Fig. 7 is a plot of a response characteristic of the circuit of Fig. 3.

With reference to Fig. 7, however, in which the response characteristic of the variable pulse width embodiment of Fig. 3 is illustrated, the phase lag is greatly reduced, particularly at small errors. This may be seen from an examination of the solid line error curve 141 and the dashed line curve 143. The dashed line curve 143 is obtained by appropriately weighting the variable width pulses 146, 147, 148, etc., and plotting them according to the center of the variable width pulses. The short duration of the pulses at small values of error bits results in greatly reduced phase lag as balance is approached. Because it is in the vicinity of true balance that it is most desirable to have a very small phase lag, the pulse width characteristic shown in Fig. 7 represents a substantial improvement over the pulse amplitude characteristic of Fig. 6.

The use of variable width pulses for energization of the motor 20 is quite convenient in view of the computer technology associated with the serial binary computer 11. Specifically, the timing of the pulse width may be effected by mathematical operations which are readily and inexpensively accomplished. In the present instance the subtractor 19 is programmed to deduct a single binary digit from the number circulating in the delay line 116. However, by changing the subtractor programming and the constant stored in the constant generator 135, the relationship between the pulse width and the error bits may readily be varied as desired.

The advantages of the motor energization characteristic shown in plot 23 of Fig. 5 are worth emphasizing. Initially, it is desirable that a single bit of error should result in a voltage large enough to start rotation of the motor. Thereafter, with increasing error bits, the voltage increases linearly at the rate of one increment of voltage for each four error bits. This extends the range in which the restoring voltage increases with increasing error bits up to 61 error bits, which corresponds to approximately 2.7° rotation of the output shaft. The above-noted departure from linearity in the voltage versus error plot near zero error increase the sensitivity of the servo loop while avoiding oscillations which might otherwise occur if a relatively steep completely linear characteristic were employed. It is also noted that timing arrangements for the variable pulse width circuit of Fig. 3 provides substantially the same current at the servomotor as the variable pulse amplitude arrangement of Fig. 2 discussed above.

Fig. 4 shows a detailed circuit diagram of the current switches shown in Fig. 2 at 62, 80 and 82 through 85, for example. Terminal 151 is the input of the current switch, and terminals 152 and 153 are connected to the ladder resistance network shown at 87 in Fig. 2. When the memory unit coupled to input terminal 151 is set to the "1" state, the transistor 154 conducts, and little current appears at the ladder output network. When the memory unit associated with the input terminal 151 is set to its "0" state, however, the transistor is cut off, and a substantial increment of current is applied to the output ladder network.

Considering the operation of the circuit in detail, the constant current source made up of the voltage applied to terminal 171 and the resistance 173 is always applied to the resistance ladder and maintains point 153 at approximately plus 3 volts. Referring to the transistor connections, the emitter of the transistor 154 is connected to ground at terminal 157. When the memory unit coupled to the input terminal 151 is set to the "0" state, the input terminal 151 is essentially open circuited, and the base of the transistor drops to near the minus two volts applied to terminal 158. With the base negative with respect to the emitter of the N–P–N transistor 154, the transistor is cut off. Accordingly, the potential of the point 159 on one side of the diode 161 rises to a value which is close to the potential of twelve volts which is applied to terminal 162. The relatively high voltage applied to terminal 163, together with the resistance 164, make up an essentially constant current source. When this current is passing into the resistance ladder including resistances R, point 153 is raised to approximately plus six volts. With point 153 at plus six volts and point 159 at nearly twelve volts, point 166 will drop to the lower of the two voltages and will become equal to six volts. Referring to Fig. 4, under these circumstances, diode 161 will be cut off while diode 168 is conducting. The constant current source made up of the voltage applied to terminal 163 and the resistance 164 will then be applied to the output ladder network through diode 168. The resistances in the output ladder network are designated by the letter R to correspond generally with the resistances R and 2R of the output ladder network 87 of Fig. 2.

The conditions in the current switch will now be considered when the memory unit associated with terminal 151 is set to the "1" state. Under these conditions, the base of the transistor 154 is raised to a positive potential of about one or two volts. Although the output from the memory unit is a series of pulses, the filter network made up of the capacitance 171 and the resistance 172 smooths out the pulses and maintains a positive voltage at the base of the transistor 154. This voltage now biases the emitter in the low resistance direction, and the transistor 154 conducts. Point 159 now drops to a voltage which is close to the ground potential of terminal 157. With point 166 at approximately plus six volts, and point 159 near ground, diode 161 conducts, and point 166 also drops to close to ground potential. The three volt potential at terminal 153 biases diode 168 to its high resistance condition and no increments of current are applied to the ladder output network from the current source made up of the voltage applied at terminal 163 and the resistance 164.

By way of example, but not of limitation, the following values may be employed for the circuit elements which appear in Fig. 4:

| | |
|---|---|
| Resistance **174** | 47,000 ohms. |
| Capacitance **171** | 150 micromicrofarads. |
| Resistance **164** | 234,000 ohms. |
| Resistance **175** | 10,000 ohms. |
| Resistance **172** | 1,000 ohms. |
| Resistance **173** | 234,000 ohms. |
| Diodes **161** and **168** | Silicon diodes. |
| Transistor **154** | Western Electric type 1853 N–P–N transistor. |

The unit of resistance R in the ladder network 87 is approximately 3,830 ohms. Thus, in Fig. 2, where the symbol 2R appears in network 37 the resistance would be about 7,660 ohms.

It is again noted that the systems of both Figs. 1 and 3 employ a voltage versus error characteristic having a steep initial slope, which is substantially reduced at higher error levels. This produces a servo system with a much higher loop gain for small error signals than for large error signals. The system is initially designed to have the optimum loop gain for large signals, as determined by stability and transient considerations. Then the increased gain for small error signals is independently adjusted to achieve an increase in accuracy and in effective bandwidth over the equivalent linear servo system.

It is to be understood that the above-described arrangements are illustrative of the application of the principles of the invention. Numerous other arrangements may be devised by those skilled in the art without departing from the spirit and scope of the invention.

What is claimed is:

1. In combination, a movable analog output element, a code indicating means coupled to said element, means for reading said code indicating means and transforming the information into coded electrical signals, a primary source of coded electrical signals indicating the desired position of said output element, means for subtracting said two sets of coded electrical signals to determine the difference between the actual and the desired position of said element, electromechanical means for moving said analog output element in response to restoring electrical signals, voltage generating means for applying electrical pulses of varying widths to said last-mentioned means, said voltage generating means including means for determining the sign of said difference, means for applying the proper polarity of voltage to said electromechanical means in accordance with said determination, means for progressively reducing said difference with increasing time, and means for de-energizing said electro-mechanical means when the sign of the difference changes.

2. In combination, a computer yielding solutions in serial binary form at predetermined spaced intervals, an output shaft, a code wheel mounted on said shaft, reading means for reading said code wheel and determining the position of said shaft in binary code terms, comparison means coupled to the output of said computer and said reading means for determining the magnitude and sign of the difference between the desired position of the shaft as indicated by the computer output and the actual position of the shaft as indicated by said reading means, a motor coupled to said output shaft, means for energizing said motor with substantially constant amplitude voltage pulses having a width which has a predetermined minimum value and increases with increased values of said difference determined by said comparison means.

3. A digital to analog converter including a digital servo loop comprising a rotatable output shaft, a digital computer yielding solutions representing the desired angular position of said output shaft at a predetermined rate, a code wheel secured to said output shaft, means for reading said code wheel and converting the indicated position of said code wheel into digital form compatible with the output from said computer at a sampling rate which is substantially higher than said predetermined rate, means for subtracting said two digital indications and determining the error between the desired and actual positions of said code wheel in digital terms, a motor coupled to said output shaft, and means for energizing said motor with a restoring current determined by the magnitude and sign of said error, the energization versus error characteristic of said last-mentioned means being relatively steep for small differences and decreasing to a more gradual linear slope.

4. A combination as defined in claim 3 wherein said motor energization means includes means for providing variable width pulses at said motor, and wherein digital subtraction means are provided for determining the width of said pulses by subtracting a constant numerical value from said error at sub-intervals of said sampling rate.

5. A digital to analog converter including a digital servo loop comprising a movable output shaft, a first means supplying code indications representing the desired angular position of said output shaft at a predetermined rate, a code wheel secured to said output shaft, means for reading said code wheel and converting the indicated position of said code wheel into digital form compatible with the output form said first code indicating means at a sampling rate which is substantially higher than said predetermined rate, means for subtracting said two digital indications and determining the error between the desired and actual positions of said code wheel in digital terms, a motor coupled to said output shaft, and means for energizing said motor with a restoring current determined by the magnitude and sign of said error, the energization versus error characteristic of said last-mentioned means being relatively steep for small differences and decreasing to a more gradual linear slope.

6. A combination as defined in claim 5 wherein said motor energization means includes means for providing variable width pulses at said motor, and wherein digital subtraction means are provided for determining the width of said pulses.

7. A digital to analog converter including a digital servo loop comprising a movable output element, a first means supplying code indications representing the desired position of said output element at a predetermined rate, a code indicating means coupled to said output element, means for reading said last-mentioned indicating means and converting the indicated position of said output element into digital form compatible with the output from said first code indicating means at a sampling rate which is substantially higher than said predetermined rate, means for subtracting said two digital indications and determining the error between the desired and actual positions of said output element in digital terms, a motor coupled to said output element and means for energizing said motor with a restoring current determined by the magnitude and sign of said error, the energization versus error characteristic of said last-mentioned means being relatively steep for small differences and decreasing to a more gradual linear slope.

8. A combination as defined in claim 7 wherein said motor energization means includes means for providing variable width pulses at said motor, and wherein digital subtraction means are provided for determining the width of said pulses.

References Cited in the file of this patent

UNITED STATES PATENTS 2,537,427 Seid et al. ______________ Jan. 9, 1951